(12) United States Patent
Huang et al.

(10) Patent No.: US 7,929,730 B2
(45) Date of Patent: Apr. 19, 2011

(54) METHOD AND SYSTEM FOR OBJECT DETECTION AND TRACKING

(75) Inventors: Ching-Chun Huang, Taichung (TW); Yao-Jen Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 789 days.

(21) Appl. No.: 11/959,462

(22) Filed: Dec. 19, 2007

(65) Prior Publication Data

US 2009/0110236 A1    Apr. 30, 2009

(30) Foreign Application Priority Data

Oct. 29, 2007    (TW) .................................. 96140534

(51) Int. Cl.
*G06K 9/00*    (2006.01)
*H04N 7/18*    (2006.01)
(52) U.S. Cl. .......................... 382/103; 382/291; 348/155
(58) Field of Classification Search .................. 382/100, 382/103, 106, 107, 155, 162, 168, 170, 173, 382/181, 189, 199, 224, 254, 274, 276, 291, 382/305, 312; 375/240.08, 240.12; 348/155
See application file for complete search history.

(56) References Cited

U.S. PATENT DOCUMENTS

| | | | | |
|---|---|---|---|---|
| 7,227,893 B1 * | 6/2007 | Srinivasa et al. | ......... | 375/240.08 |
| 7,548,648 B2 * | 6/2009 | Toyama et al. | ............... | 382/173 |
| 7,860,162 B2 * | 12/2010 | Yokomitsu et al. | ...... | 375/240.12 |
| 2005/0002572 A1 * | 1/2005 | Saptharishi et al. | .......... | 382/224 |
| 2005/0104964 A1 * | 5/2005 | Bovyrin et al. | ............... | 348/155 |
| 2005/0286738 A1 * | 12/2005 | Sigal et al. | .................... | 382/103 |
| 2006/0045335 A1 | 3/2006 | Toyama et al. | ............... | 382/171 |

* cited by examiner

*Primary Examiner* — Seyed Azarian

(57) ABSTRACT

Disclosed is a method and system for object detection and tracking. Spatio-temporal information for a foreground/background appearance module is updated, based on a new input image and the accumulated previous appearance information and foreground/background information module labeling information over time. Object detection is performed according to the new input image and the updated spatio-temporal information and transmitted previous information over time, based on the labeling result generated by the object detection. The information for the foreground/background appearance module is repeatedly updated until a convergent condition is reached. The produced labeling result from objection detection is considered as a new tracking measurement for further updating on a tracking prediction module. A final tracking result may be obtained through the updated tracking prediction module, which is determined by the current tracking measurement and the previous observed tracking results. The tracking object location at the next time is predicted. The returned predicted appearance information for the foreground/background object is used as the input for updating the foreground and background appearance module. The returned labeling information is used as the information over time for the object detection.

18 Claims, 9 Drawing Sheets

METHOD AND SYSTEM FOR OBJECT DETECTION AND TRACKING

FIELD OF THE INVENTION

The present invention generally relates to a method and system for object detection and tracking.

BACKGROUND OF THE INVENTION

Object detection and tracking is an important computer vision technology, and plays a basic and key role in video surveillance. Through correct object detection and tracking, the correct object profile and object trajectories may be obtained. The information is the basis for high level video identification, and if the information is incorrect, the stability and the accuracy of the high level video surveillance system will be in doubt.

The rapid progress of the computer vision technologies and the emphasis of the public on the personal safety and property security facilitate the development of intelligent video surveillance and related management services. A stable object detection and tracking system is becoming an ever important part in assisting the administrators to achieve the capability in remote and long time surveillance with minimum man power.

U.S. Patent Publication No. 2005/0286738A1 disclosed the graphical object models for detection and tracking. The graphical object models disclosed an architecture for spatio-temporal object detection systems. Based on the characteristics of the target object, such as pedestrian or cars, the system decomposes the object into a plurality of smaller objects, such as hand, foot, torso, and so on. Through the combined model of the smaller objects, the system determines the location and the size of specific objects appearing in a single image. The detection information will be passed to the next image so that the architecture of the spatio-temporal object detection system is formed. In the disclosed document, the combined model of smaller objects must learn the model of specific objects in advance and only keeps tracking of specific objects.

U.S. Patent publication No. 2005/0002572A1 disclosed the methods and systems for detecting objects of interest in spatio-temporal signals. As shown in FIG. 1, sensor 101 collects spatio-temporal data 101a. Spatio-temporal data 101a, after color conversion and quantization, is passed through a foreground/background separation module 104 of object detection and tracking architecture 100, and the spatio-temporal signals are separated and foreground/background classification labeling is performed on each location point. Then, through a spatial grouping module 105 to group the neighboring foreground into the same object. A temporal tracker 103 is used to track the movement of the foreground objects along the time line. Then, an object classification module 106 classifies the foreground objects into different semantic objects, such as cars, pedestrians, and so on. The classification information is fed to foreground/background separation module 104 to modify the model parameters so that the foreground and background areas and objects classified by the new foreground model and the background model parameters will match. This document did not disclose the information sharing between object tracking and object detection modules, and provided no disclosure on the whole object shape labeling information in foreground/background detection.

U.S. Patent Publication No. 2006/0045335A1 disclosed the background maintenance of an image sequence on multiple spatial scales. The multiple image scales include a pixel scale, a regional scale, and a frame scale. The computation of the pixel scale is through background subtraction to obtain the initial foreground divided regions. The computation of the regional scale is through the regional combining of the neighboring foreground pixels to obtain the overall foreground objects. The computation of frame scale is through the determination of the regions requiring update in the background model to refine the current background model. The document disclosed the concept of using background model to detect objects.

U.S. Patent Publication No. 2005/0104964A1 disclosed a method and apparatus for background segmentation based on motion localization. The document disclosed a method of combining image subtraction and background construction to construct the detection system, and is able to target at the unexpected small camera motion to perform motion compensation and detection. The image subtraction may detect the rough boundary of a moving object, and the clustering is used to find the object blocks. The rest image blocks are determined as background and are used for updating and constructing the background model. The camera movement is determined by continuously observing whether the background features move. This technique directly estimates the random camera movement for motion compensation; therefore, it is very time-consuming for complete pixel movement.

In the aforementioned techniques or other prior arts, when a new image is input, through the observed new image and the previous foreground model and background model, the following equation may be used to compute the observation probability of each image point being a foreground F or background B:

$$p(x \mid \Omega_B) = \frac{1}{N_B} \sum_{Bi=0}^{n} \varphi(x - y_{Bi}) \quad \text{(eq. 1a)}$$

$$P(x \mid \Omega_F) = \alpha \times \frac{1}{U} + (1-\alpha) \times \frac{1}{N_F} \sum_{Fi=0}^{m} \varphi(x - y_{Fi}) \quad \text{(eq. 1b)}$$

where $N_B$ and $N_F$ are the positive programming parameters of probability, and $\varphi(\ )$ is a kernel density function. $y_{Bi}$, $y_{Fi}$ belong to the training observation points of the background model and foreground model, respectively, and are located at background model storage sequence and foreground model storage sequence. $\Omega_B$ and $\Omega_F$ are the classification of the background and the foreground. $U^{-1}$ is a fixed parameter, representing the probability of uniform distribution. n represents the number of all the background training points in the background model image sequence, and m represents the number of all the foreground training points in the foreground model image sequence. $\alpha$ is a weight parameter.

Through viewing an unknown location in an image and the unknown color value of the unknown location as a multi-dimensional random vector X, the probability model may take feature space and the space domain variance into account simultaneously. The more the observed data, the more reliable the estimated model distribution.

As the above equation shows, the determination rule of a simple labeled image point may include the comparison of the probabilities of foreground F and background B in the above equation, and then executing a hard decision. However, this approach will cause inaccurate detection. For example, when the appearance features of an object are similar to the appearance features of the foreground, the simple observation probability will cause confusion. Obviously, the foreground probability and the background probability are almost equal in this case. If only the current observed probability is used in determination, such as Gaussian Mixture Model (GMM) for object detection, there will be obvious detection error, and the accurate classification of the object will be impossible.

Many of the past technologies in object detection and tracking are built upon the enhancement of the low level video signal analysis. The more stable the low level video signal analysis, the more accurate the high level video signal analysis. However, the conventional object detection and tracking technologies usually focus on enhancing and improving a single technique, for example, object detection focusing on maintaining background information, or object tracking focusing on maintaining tracked object information. Most conventional technologies do not emphasize the overall video analysis; i.e., that the object detection and object tracking should share the information. In actual applications, the light change, climatic change and dynamic background will all affect the accuracy of video surveillance and the effectiveness of intelligent video surveillance. The low level information should provide the basis for high level decision, and the high level information should feedback to improve the reliability of low level processing.

SUMMARY OF THE INVENTION

In an exemplary embodiment, the present disclosure is directed to a method of object detection and tracking, for detecting and tracking plural images generated by a moving object in a scene. The method comprises: updating a foreground and background appearance model information according to an input new image and previous accumulated appearance information and previous foreground and background labeling information; performing object detection according to the updated foreground and background appearance model information and past propagated temporal information, such as predicted labeling information, and input image; using the labeling generated by the object detection process to repeatedly update the foreground and background model information until a convergence condition being satisfied; using the detection result as a new tracking estimate result to update a tracking prediction model; using the updated tracking prediction model to obtain a final tracking result which being based on the present tracking estimate and the past observed tracking result; and predicting the object location at the next time and returning the predicted foreground d object location and appearance information for the step of updating the foreground and background appearance model, and predicted labeling information for time-axis information of object detection.

In another exemplary embodiment, the present disclosure is directed to an object detection and tracking method for detecting and tracking a plurality of images generated by a moving object in a scene. The method comprises: using a foreground and background probability mode to model the object foreground and background appearance model of the scene; performing object detection and optimal labeling of object foreground and background in the scene according to the present foreground and background appearance model and the time domain information, such as predicted labeling information; determining the present object location in the scene according to the newest measured object foreground and background labeling information in the scene and the past trained object movement information, and updating the object movement model and predicting the object location at the next time; and updating the foreground and background appearance model according to the past object detection result and object movement information.

In yet another exemplary embodiment, the present disclosure is directed to an object detection and tracking system for detecting and tracking a plurality of images generated by a moving object in the scene. The system comprises: a foreground and background appearance model updating module for updating the object foreground appearance model and background appearance model according to an input new image and the appearance information and foreground and background labeling information accumulated at previous time; an object detection module for object detection and determining the optimal classification labeling at present time according to the input new image, the updated foreground appearance model and the background appearance model, and the past propagated time axis information, such as predicted labeling information; and a tracking prediction updating module, using the detection result from the object detection module, such as optimized labeling information, to update the foreground and background appearance model information until a convergent condition being met, and the convergent detection result being treated as a new tracking measure result for updating an initial value to predict the location of the tracked object at the next time, and returning the predicted foreground and background object labeling and appearance information to the background and foreground appearance model update module as information for updating the foreground and background appearance models.

In the disclosed exemplary embodiments, the technical features lie in the simultaneous maintenance of the foreground appearance model of the object and the background appearance model, and the information exchange and feedback of object detection and object tracking.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

In the disclosed embodiments, the present invention uses a probability model architecture to simulate the uncertainty of characteristic information and the spatial information in order to adapt to the actual environment, such as the light and shadow change, camera movement caused by wind or earthquake, and changing background, such as waving tree and fountains. On the other hand, through the information sharing between the object detection and object tracking processes and the prediction information of the object presence provided by the information of the past, the present invention may improve the object detection accuracy. The object detection result is feedback to the object tracking as the required measure information to improve the object tracking accuracy. The present invention combines the object tracking and object detection with the simulation of the uncertainty of the time domain, characteristic domain and spatial domain to achieve the simultaneous maintenance of the analysis architecture of the foreground model and background model.

A video scene may be divided into a plurality of independent objects. The independent motion of the objects generates a successive series of video. The disclosed embodiments consider this as essential to the success of object detection and the object tracking. Therefore, a scene in the disclosed embodiments consists of three types of models, namely, appearance model, motion model and labeling model. The independent objects are classified as background objects and foreground objects. The appearance model provides information such as appearance, texture and color of the foreground object and background. The motion model provides information such as velocity, acceleration of the foreground object motion. The labeling model provides information such as the location labeling of each object.

Figure 1:
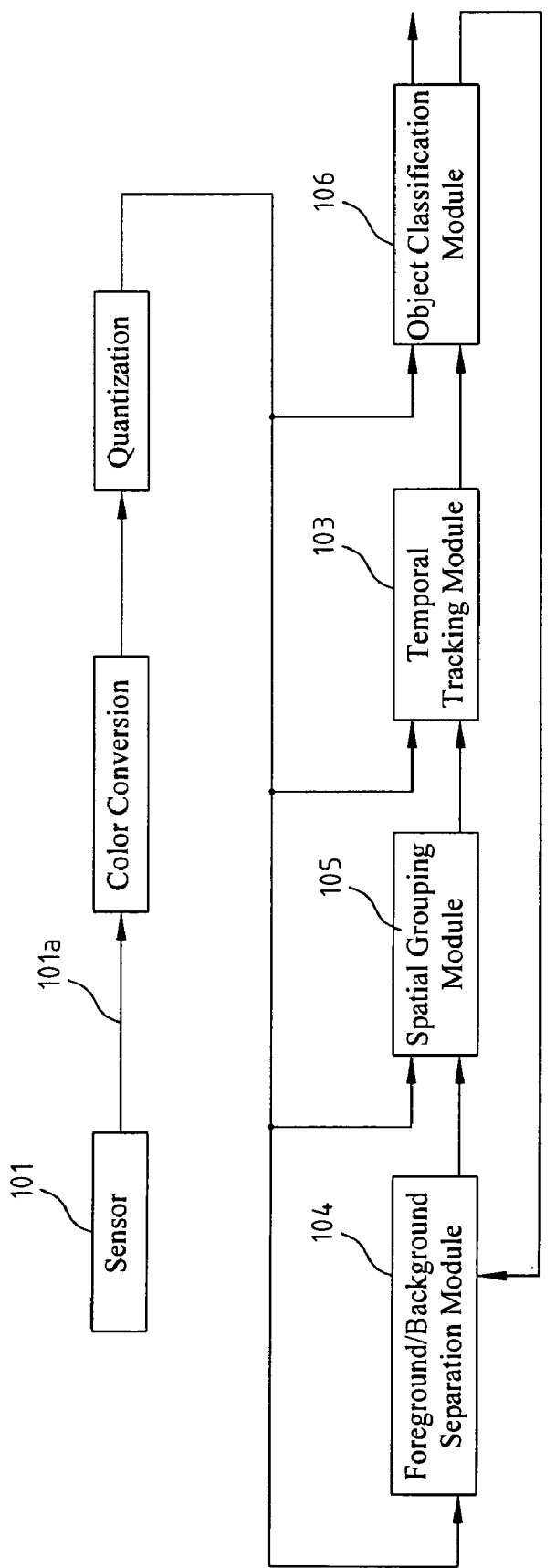
FIG. 1 shows a block diagram of a method and system for spatio-temporal object detection.
Figure 2:
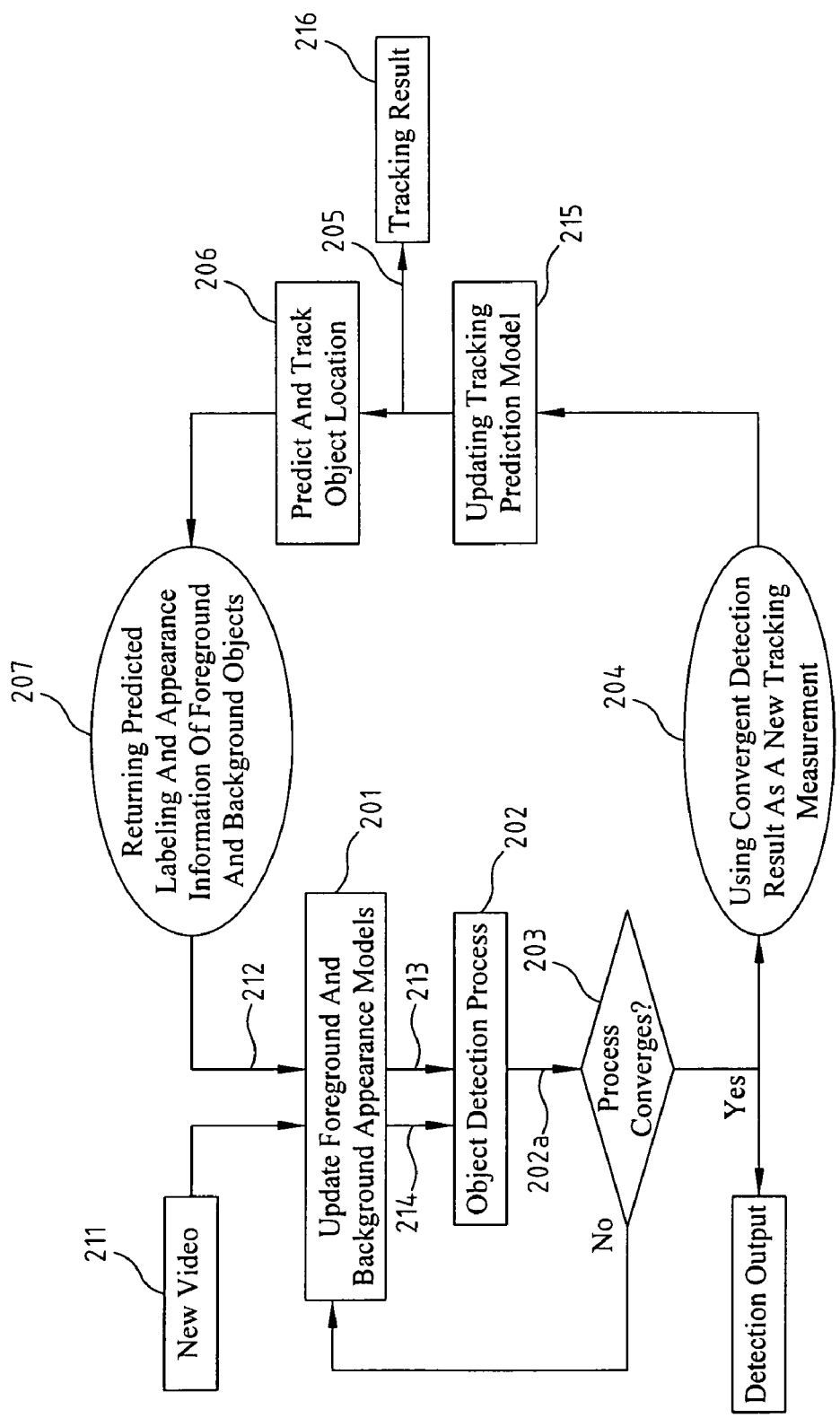
FIG. 2 shows a schematic view of an exemplary method for object detection and tracking, consistent with certain disclosed embodiments.

FIG. 2 shows a schematic view of an exemplary method for object detection and tracking, consistent with certain disclosed embodiments. The operation of the exemplary method mainly comprises the information sharing and feedback between the object detection process and object tracking process.

As shown in FIG. 2, based on an input new video 211 and accumulated information 212 of the past, the information of a foreground and background appearance model is updated, as shown in step 201. Based on the updated foreground and background appearance model information 213 and the propagated time axis information of the past 214, such as predicted labeling information, step 202 is to execute the object detection process. Step 203 is to determine whether a convergent condition is met according to the detection result 202a of the object detection process, such as the result of the foreground and background optimized labeling classification. If not, return to step 201 to use detection result 202a to update the foreground and background appearance model until a convergent condition is met. The convergent condition may be the similarity between the before and after detection results, or a pre-defined condition. As shown in step 204, the convergent detection result, such as the foreground and background optimized labeling classification result, is used as a new tracking measure result for updating a tracking prediction model (step 215). As shown in step 205, the updated tracking prediction model 215 may be used to obtain a final tracking result 216, such as the location of the object. Final tracking result 216 is determined by the combination of the current tracking measure and the past observed tracking result. The following step 206 is to predict the location of the tracked object at the next time. Then, return the labeling and appearance information of the predicted foreground and background object as the input information to update the foreground and background appearance model, as shown in step 207.

Through the simultaneous maintenance of foreground and background appearance models, the situation in which the areas cannot be correctly classified by the object detection based on the appearance information may be detected under the situation that foreground appearance information and the background appearance information are pretty similar. These areas may be correctly classified and labeled based on the past propagated time axis information, such as predicted labeling information. The predicted labeling information may be provided by the object tracking prediction module. For object tracking, the foreground appearance model and the background appearance model may be compared and affect each other so that the areas of the foreground and back ground areas with the more distinguishable appearance may be selected. In object tracking, the information of the areas with more distinguishable appearance is enhanced for tracking, and the tracking is more robust. In this manner, the object tracking process and the object detection process are integrated. Through the information sharing and feedback of these two processes, the accuracy of object detection and the reliability of object tracking are both improved.

The present invention provides a mechanism for memorizing and learning the past object motion. The object movement is predicted through memorizing the object motion mode, and the real-time measure information obtained by object detection is integrated to solve the final object location and object profile. In addition, the present invention also takes the uncertainty caused by the external environment on the video analysis into account, such as the uncertainties of feature area, the spatial domain and the time domain. These uncertainties may be expressed by the probability simulation.

For example, the uncertainty of feature areas may include that the measured video color feature of the same area may differ at different time because of the different external light source. The uncertainty of the spatial domain is caused by the dynamic environment of the reality, such as waving braches or leaves, rotating fan, non-periodical fountain, or camera shake caused by strong wind. These changing backgrounds lead to the variation of the location. The uncertainty of time domain is from the uncertain variation of the time. For example, the current location of a pixel is A, and the location at the next time is B. But when measuring, the prediction cannot accurately estimate the next time location of the pixel is B, and therefore the pixel mapping uncertainty in the time axis prediction information is generated.

To make the foreground and background models able to effectively control the uncertainties of feature domain, time domain and the spatial domain, the present invention uses a probability model to simulate the architecture, and divides the objects in the scene into the foreground and the background. Therefore, when a new observation is obtained, the probability model architecture may provide the probability of whether the observation belongs to the foreground or the background.

The simulation probability models are usually divided into two types, i.e., those using parameters and those using non-parameters. For example, the kernel density method is a simulation probability model using non-parameters to estimate the probability. The kernel density method estimates the probability model of the foreground and background appearance which use equations (1a) and (1b).

Figure 3:
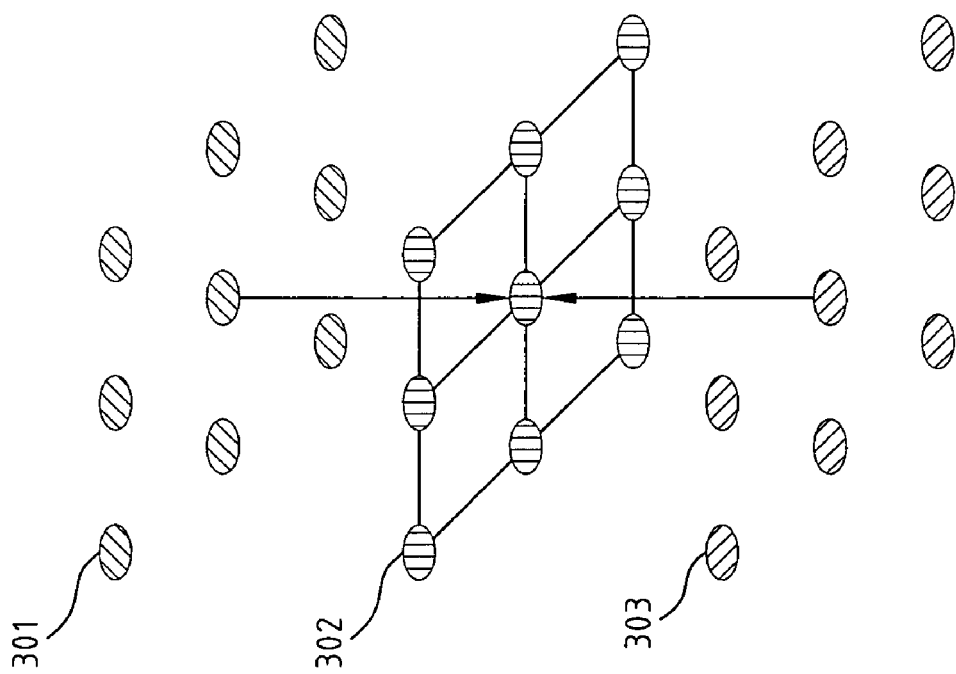
FIG. 3 shows a schematic view of an exemplary 3-layer mechanism used in object detection, consistent with certain disclosed embodiments.

In the disclosed exemplary embodiments, the object detection uses a 3-layer mechanism to process the optimal labeling of the object detection. The 3-layer mechanism may include the topmost observation information layer, the middle hidden labeling layer, and the bottom memory prediction layer. As shown in FIG. 3, observation information layer 301 provides the currently observed video color information. Hidden labeling layer 302 provides the optimal labeling of each pixel. Memory prediction layer 303 provides the predicted labeling propagated from the past. The 3-layer mechanism provides a systematic method to determine the optimal labeling of each pixel of hidden labeling layer 302 according to the known information of observation information layer 301, memory prediction layer 303, and the aforementioned probability model of the background appearance and foreground appearance.

In the disclosed embodiments, the background appearance model and the background appearance model may be constructed through the kernel density method. The object detection process is performed according to (1) the current foreground and background appearance models, (2) the predicted labeling information propagated through the object tracking in the past time domain, and (3) the current observed video color information. The object detection, through constructing the aforementioned 3-layer network, effectively integrates the accumulated information of the spatial domain (through the foreground and background appearance models), the accumulated information of the time domain (through the predicted labeling information), and the current observed video color information for reaching the optimization decision to improve the accuracy of object detection.

Figure 4:
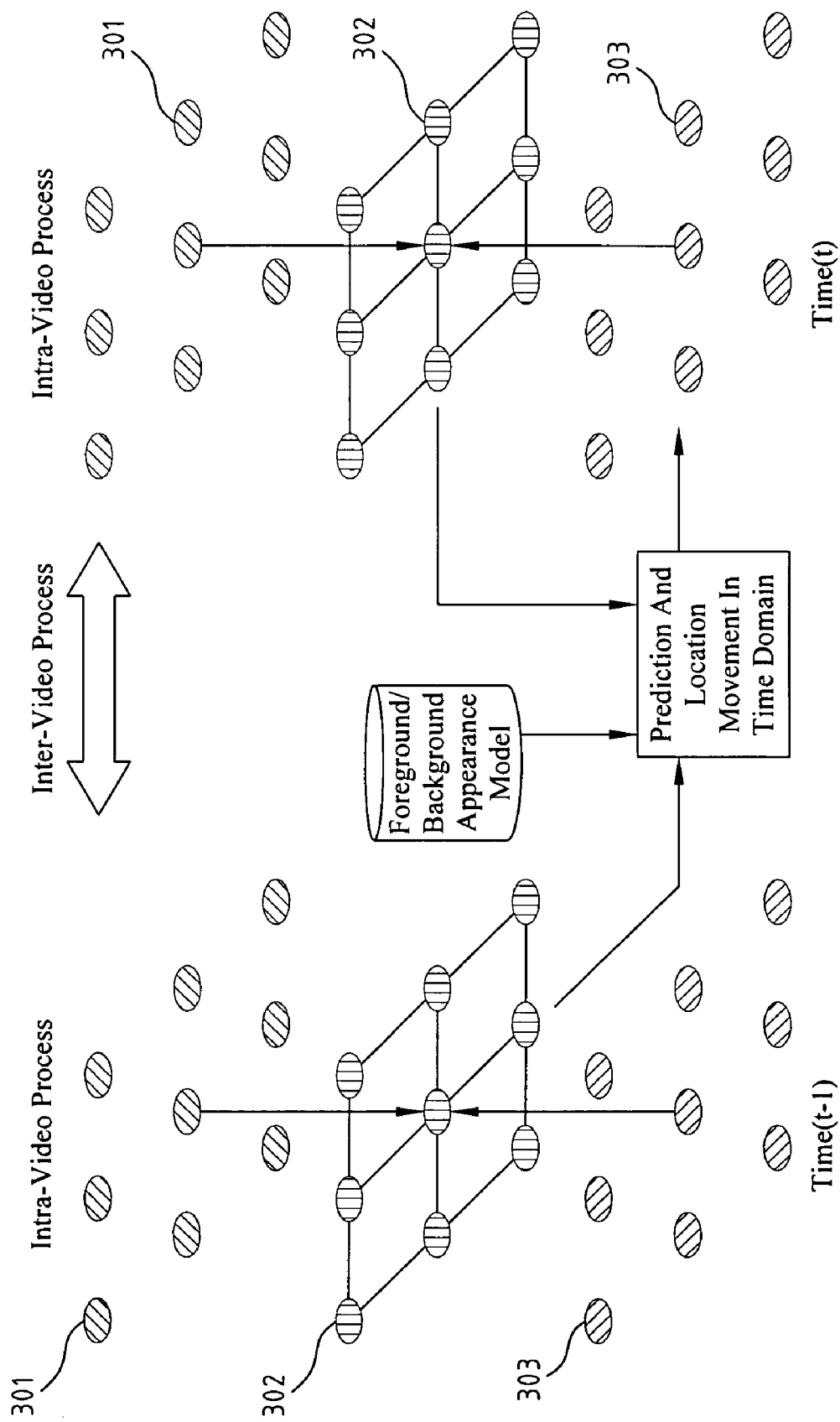
FIG. 4 shows a schematic of an exemplary object detection process, consistent with certain disclosed embodiments.

FIG. 4 shows a schematic of an exemplary object detection process, consistent with certain disclosed embodiments. Referring to FIG. 4, the object detection process, according to the current foreground and background appearance models, transforms the labeling of each pixel at previous time t−1 to the predicted location at time t, and generates memory prediction layer 303 at time t. Memory prediction layer 303 at current time t provides the predicted labeling propagated from the past.

The object detection process may be defined as an optimization problem. The optimization problem is to determine, according to the current observed video information, the appearance information of the updated foreground and background models and the predicted labeling propagated from the previous time, the optimal labeling at the current time. To achieve the optimization, the object detection process needs the current observed information, i.e., the current video input, memory prediction layer 303 at time t, the foreground appearance probability model $P(x|\Omega_F)$ and the background appearance probability model $p(x|\Omega_B)$. Therefore, after the optimization, hidden labeling layer 302 at time t may provide the optimal hidden labeling L at current time t.

The optimization problem may be described with the following equation:

$$p(L|D) \approx p(D|L)p(L) \quad (2)$$

where L is a labeling of each pixel of the entire video, D is the observed video information, $p(D|L)$ is the likelihood function, and $p(L)$ is the prior probability information.

Equation (3) may be obtained by performing logarithm on equation (2), and the obtained L may be described as equation (4).

$$E(L|D) = \ln(p(L|D)) \approx \ln(p(D|L)) + \ln(p(L)) \quad (3)$$

$$L = \underset{l}{\operatorname{argmax}} E(L|D) \quad (4)$$

In other words, the optimization problem is descried as a maximization problem with a combination of a likelihood function and a prior probability information.

The following describes $p(D|L)$. Assume that $d_i$ is the color information labeling of a certain pixel in a video, and the entire video includes k pixels. Further assume that on the condition that labeling L is know, $d_i$ and $d_j$ are two independent random variables, and $d_i$ is only related to $l_i$. Therefore, $p(D|L)$ may be rewritten as equation (5).

$$\ln(p(D|L)) = \sum_k \ln(p(d_i|l_i)) \quad (5)$$

$p(d_i|l_i)$ is marked as 201 of FIG. 2, and may be obtained by using the observed probability information provided by the foreground appearance model F and background appearance model B constructed by equation (1). Because the X of equation (1) represents a 5-dimensional random variable (x, y, r, g, b), and $d_i$ is the 3-dimensional random variable (r, g, b) on the condition of a certain location i=(x,y), the relation between $p(d_i|l_i)$ and equation may be expressed as equation (6):

$$p(d_i|l_i)p(r,g,b|\Omega,x,y) = \frac{p(r,g,b,x,y|\Omega)}{p(x,y|\Omega)} \quad (6)$$
$$= \frac{p(X|\Omega)}{p(x,y|\Omega)},$$

$$\forall \Omega \in \{\Omega_B, \Omega_{NB}, \Omega_F\}$$

In the present disclosure, the simulated prior probability information $p(L)$ includes the spatial domain information and time domain information. The information from the two domains may be treated as independent. Therefore, $p(L)$ may be rewritten as equation (7):

$$p(L) = p_s(L) \Box p_t(L) \quad (7)$$

where $P_s(L)$ is the spatial posterior classification probability of the entire video, and $P_t(L)$ is the temporal posterior classification probability of the entire video.

The spatial posterior classification probability $P_s(L)$ may be further described as equation (8):

$$p_s(L) \propto \exp\left(-\sum_{i \in K}\sum_{j \in N_i} V^s_{(i,j)}(l_i,l_j)\right). \quad (8)$$

where $l_i$ is the classification (F,B) of the i-th pixel of the video, K is the set of the pixels of the entire video, $V_{(i,j)}^s(l_i,l_j)$ describes the relation between the two neighboring points in the video space, and S is the spatial prior information.

The relation $V_{(i,j)}^s(l_i,l_j)$ between the two neighboring points in the video space may be further written as equation (9):

$$V_{(i,j)}^s(l_i,l_j) = W_s(\text{img}(i),\text{img}(j)) \Box (1-\delta(l_i,l_j)) \quad (9)$$

Figure 5:
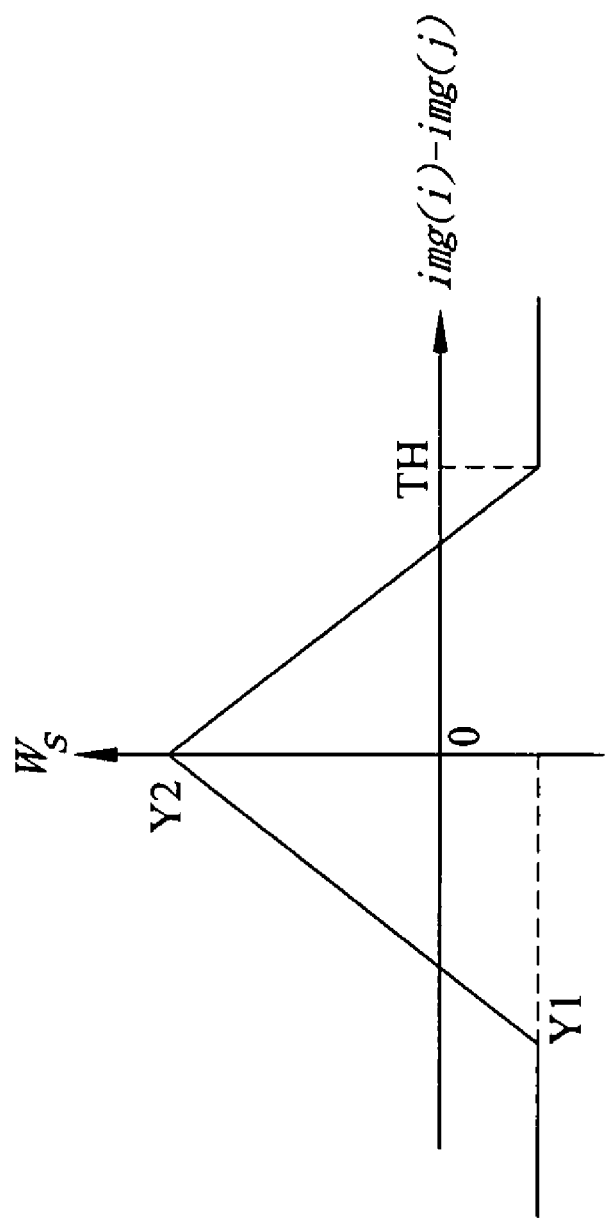
FIG. 5 shows an exemplary penalty weight function used by the spatial prior information, consistent with certain disclosed embodiments.

Equation (9) describes a penalty weight $W_s(\text{img}(i)-\text{img}(j))$ given by the system to a spatial relation when labeling $l_i$ and $l_j$ of two neighboring points are different, where $W_s()$ may be expressed as FIG. 5. In FIG. 5, img(i) is the video of the i-th pixel. When the difference between the videos of point i and point j is zero and the labeling difference between $l_i$ and $l_j$ is $\delta(l_i,l_j)=0$, the penalty weight is heavy, defined as $W_s=Y2$. When the video difference is large and exceeding the system-defined threshold TH, it means that it is reasonable to have different labeling $l_i$ and $l_j$. In this case, the penalty weight $W_s$ is negative. The minimum penalty weight is $W_s=Y1$, where $\delta()$ is the Dirac's delta function.

In addition to the spatial prior information, the system according to the present invention also has the time axis labeling information left by the past memory. The time axis labeling information is mainly information propagated through object tracking. This information represents the predicted possible location of the object based on the past object tracking memory. The temporal posterior classification probability information $P_t(L)$ may be described as equation (10):

$$p_t(L) \propto \exp\left(-\sum_{i \in K} V^t_{(i^t, i^{t-1})}\left(l_i^t, l_{j \xrightarrow{w} i}^{t-1}\right)\right). \tag{10}$$

where $$l_{j \xrightarrow{w} i}^{t-1}$$

is the classification of the pixel originally with location at j at time t−1, and the pixel is predicted to move to the location at i at current time t.

$$V^t_{(i^t, i^{t-1})}\left(l_i^t, l_{j \xrightarrow{w} i}^{t-1}\right)$$

describes the impact of classification $$l_{j \xrightarrow{w} i}^{t-1}$$

propagated at time t−1 has on classification $l_i^t$ of point i to be obtained at current time t.

$$V^t_{(i^t, i^{t-1})}\left(l_i^t, l_{j \xrightarrow{w} i}^{t-1}\right)$$

can be described as equation (11):

$$V^t_{(i^t, i^{t-1})}\left(l_i^t, l_{j \xrightarrow{w} i}^{t-1}\right) = W_t \cdot \left(1 - \delta\left(l_i^t, l_{j \xrightarrow{w} i}^{t-1}\right)\right), \forall i, j \in K \tag{11}$$

where $W_t$ is a fixed parameter. When classification $l_i^t$ obtained at current time t and classification $$l_{j \xrightarrow{w} i}^{t-1}$$

propagated by the past information violate, the system will give a fixed penalty weight $W_t$. The temporal prior information combined with the spatial prior information and the current observed information and foreground and background appearance models are used for the basis for the final decision of classification L. This consideration basis may make the memory information of time domain to provide a reasonable decision making basis when the current appearance observation information cannot distinguish the object.

From the above equations (5), (6), (8) and (10), it is clear that all the information required by equation (3) is described in details. In a dynamic environment, such as non-periodical fountain and weaving leaves, the disclosed embodiments show the memory information of time domain may improve the accuracy of object detection.

The following is to obtain the maximizing L for equation (3). There are many optimization methods may be used for maximization, such as graph cuts method or Bayesian belief propagation method. In the disclosed exemplary embodiments, the graph description of the graph cuts method is used to infer the entire model and alpha expansion method is used for selecting the optimal L so that equation (3) approximates the optimal.

On the other hand, the object tracking process, marked 203 of FIG. 2, uses in addition to the current observed information as a basis for object tracking, the memory information of the past object motion. There are many object tracking techniques having the capability of remembering the past object motion model. The disclosed exemplary embodiments use Bayesian filter as an embodiment for describing the dynamic system of object motion model. The famous particle filter and Kalman filter both belong to this type of methods.

Basically, an object tracking model with memory may be described by the state transition and the measurement process of the dynamic system in order to account for the impact of the past memory information and the current observed information on the object tracking. The state transition may be described by equation (12a), and the measurement process can be described by equation (12b):

$$x_t = f_t(x_{t-1}, v_{t-1}) \tag{12a}$$

$$z_t = h_t(x_t, n_t) \tag{12b}$$

Equation (12a) describes the use of past state information $x_{t-1}$ through $f_t()$ to estimate the current possible state $x_t$, where $v_{t-1}$ is the possible noise estimated by the past state. Equation (12b) describes the possible measured current observed information $z_t$ assuming that the current state $x_t$ is known, where $n_t$ is the possible noise of the measurement.

Assume that state $x_t$ is a random vector variable, and a certain element of the random vector variable represents the current object location, then the object tracking problem may be described as the maximization problem of the probability of equation (13), where $x^t$ is the most suitable state estimation at current time t. $x^t$ is a real number.

$$x^t = \underset{x}{\operatorname{argmax}}\, p(x_t \mid z_{1:t}) \tag{13}$$

where $p(x_t \mid z_{1:t-1})$ is the prior probability function of the past memory. The prior probability function may be approximated by the state transition of the dynamic system, i.e., equation (12a), and posterior function $p(x_{t-1} \mid z_{1:t-1})$ at the previous time. Through Bayesian rule, equation (13) may be factored as equation (14):

$$p(x_t \mid z_{1:t}) \approx p(z_t \mid x_t) p(x_t \mid z_{1:t-1}) \tag{14}$$

where $p(z_t \mid x_t)$ is the likelihood function of the current observed information, which corresponds to the measurement process, i.e., equation (12b), of the dynamic system.

As aforementioned, the disclosed embodiments may take Kalman filter as an example for simulating the object tracking process. Therefore, the entire dynamic system may be described by equation (15):

$$x_t = F_t x_{t-1} + G_t v_{t-1}$$

$$z_t = H_t x_t + J_t n_t \tag{15}$$

where two noise random vectors $v_{t-1}$, $n_t$ are assumed to have Gaussian distribution, and posterior function $p(x_{t-1}|z_{1:t-1})$ at the previous time and posterior function $p(x_t|z_{1:t})$ at the current time are also assumed to have Gaussian distribution, then the optimization of equation (13) may be easily processed as linear operation.

As shown in the following equation (16), $p(x_t|z_{1:t})$ is Gaussian distribution whose mean vector is the estimation for $m_{t|t}$ that may optimizes equation (13). $P_{t|t}$ is the covariance matrix of a multi-dimensional Gaussian distribution.

$$p(x_t|z_{1:t})=N(m_{t|t},P_{t|t}) \quad (16)$$

$m_{t|t}$ and $P_{t|t}$ be obtained by the linear operation of equation (17):

$$m_{t|t}=m_{t|t-1}+K_t(z_t-H_t m_{t|t-1})$$

$$P_{t|t}=P_{t|t-1}-K_t H_t P_{t|t-1} \quad (17)$$

where $K_t$ is the Kalman gain, $m_{t|t-1}$ is the system state $x^t$ predicted by the system the memory information, i.e., $m_{t|t}$ Kalman gain $K_t$ is a weight, and may dynamically determine the current observed information $z_t$, and may be obtained by equation (18).

$$K_t=P_{t|t-1}H_t^T(H_t P_{t|t-1} H_t^T + J_r R_t J_r^T)^{-1} \quad (18)$$

where $R_t$ is the covariance matrix of the noise random vector $n_t$ of the dynamic system.

$m_{t|t-1}$ and $P_{t|t-1}$ of equation (18) may be predicted by the dynamic system according to the memory information, as expressed by equation (19):

$$m_{t|t-1}=F_t m_{t-1|t-1}$$

$$P_{t|t-1}=G_t Q_{t-1} G_t^T + F_t P_{t-1|t-1} F_t^T \quad (19)$$

where $Q_{t-1}$ is the covariance matrix of noise random vector $v_{t-1}$ of the dynamic system. $m_{t-1|t-1}$ and $P_{t-1|t-1}$ may be obtained by solving at the previous time. $z_t$ of the system is the current observed object location. $m_{t|t}$ is the current system state, and is a 4-dimensional vector. The vector includes the current object location (x, y) and the current velocity (u, v).

$F_t$ and $H_t$ described by the dynamic system of equation (16) may be described by the relation of the location and velocity. In the dynamic system, the following relation may be defined, i.e. $G_t=I$, $J_t=I$.

Therefore, the object tracking process, marked 203 of FIG. 2, uses Kalman filter to simulate the object motion model so that the system may combine the past memory information and the current appearance observed information together for consideration. When the current observed information cannot provide effective information, such as the temporary occlusion, the time axis memory information may provide suitable object tracking estimation.

Figure 6A:
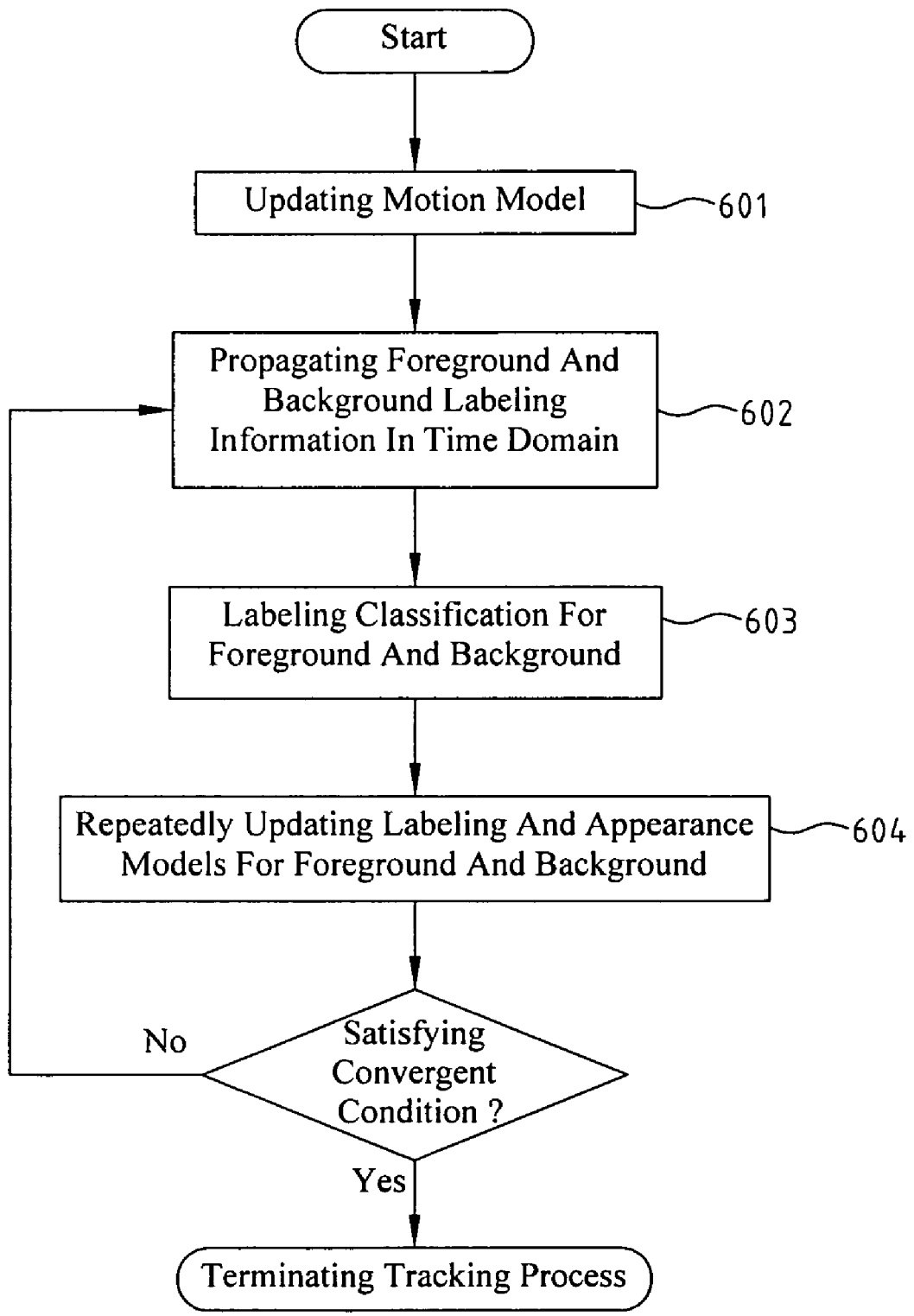
FIGS. 6a-6b show the interaction between the object detection process and the object tracking process, consistent with certain disclosed embodiments.
Figure 6B:
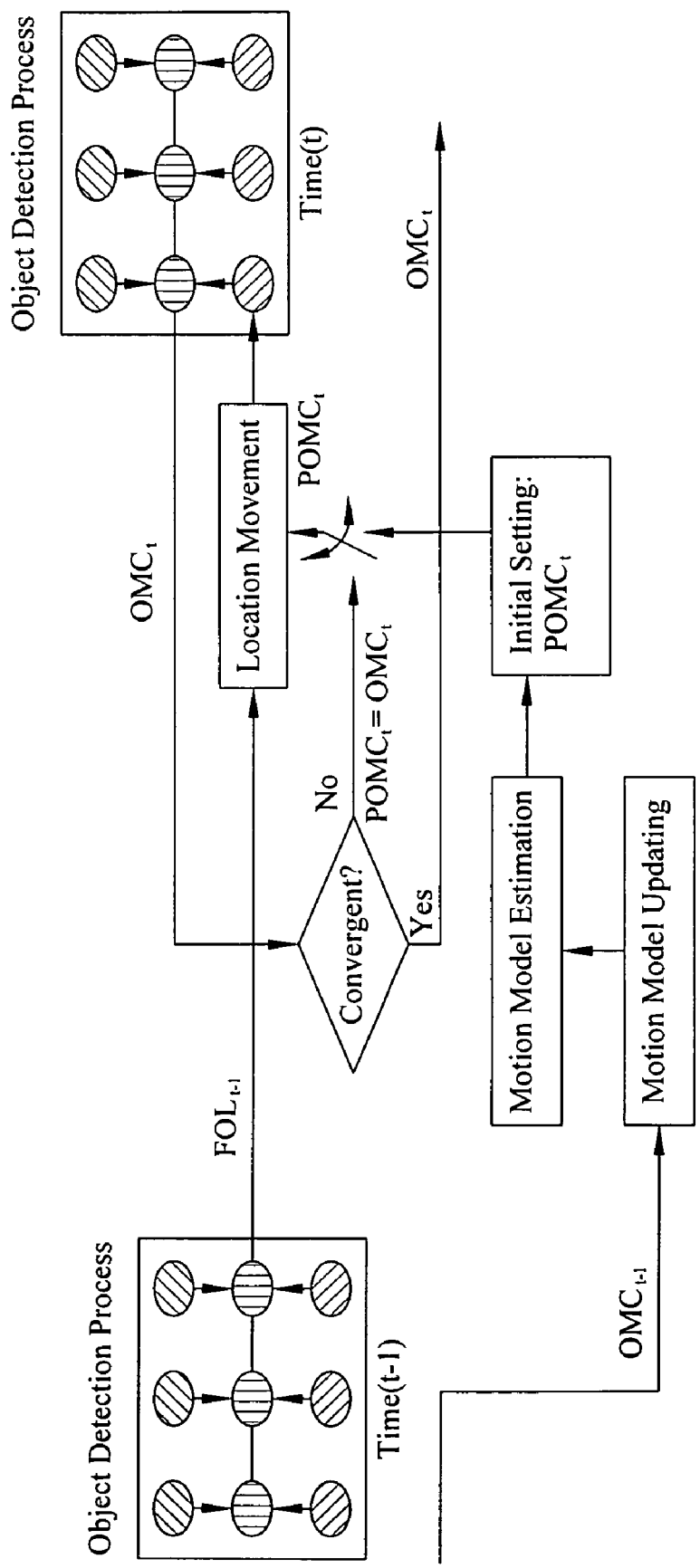

In the disclosed embodiments, the object detection process and the object tracking process are closely related. FIGS. 6a-6b further explain the interaction between the object detection process and the object tracking process.

Assume that classification labeling L at previous time t−1 is obtained in the earlier process. In the early classification process, some foreground objects are assumed to have been detected, and clearly classified and labeled. For each detected foreground object, the object location is set, such as object mass center ($OMC_{t-1}$). For each pixel of the foreground object, a foreground object labeling ($FOL_{t-1}$) is assigned. Then, the object tracking module is to determine the foreground object location based on the information of past time t−1, $OMC_{t-1}$ and $FOL_{t-1}$, and the tracking measurement at current time. The tracking measurement is obtained from the optimal labeling result of the object detection. FIG. 6a shows the interaction between the object tracking process and the object detection process, consistent with certain disclosed embodiments. As shown in FIG. 6a, it is accomplished with the following four steps, i.e. updating motion model 601, propagating foreground and background labeling information on time domain 602, foreground and background labeling classification 603, and repeating updating the foreground and background labeling and appearance models information 604 for foreground and background.

In step 601, it is to update the object motion model, such as Kalman filter, for each foreground object by using its location at previous time t−1, such as $OMC_{t-1}$. Based on the updated object motion model, the possible location $POMC_t$ of the foreground object at time t and the appearance information at location $POMC_t$ are predicted. $POMC_t$ is used as the initial value of the predicted foreground object at time t.

Based on the initial value of the predicted location for the foreground object, such as $POMC_t$, the foreground object labeling $FOL_{t-1}$ at previous time t−1 is transformed to the predicted location at time t and the memory prediction layer 303 of FIG. 3, may be generated, as shown in step 602. Memory prediction layer 303 provides the object detection with the prior labeling classification information in the time domain.

In step 603, it may use optimization equation (3) to obtain hidden labeling layer 302 at time t based on the object detection process. As aforementioned, for optimization, the information required includes the current observed information (i.e., current video input), memory prediction n layer 303 at time t, foreground appearance probability model $P(x|\Omega_F)$ and background appearance probability model $p(x|\Omega_B)$ After the optimization, optimal hidden labeling L at time t will be obtained.

In step 604, it may re-estimate $OMC_t$ of each foreground object by using obtained hidden labeling L. If the location of each object, such as $OMC_t$, falls within own predicted area $POMC_t$, such as defined area centered around the predicted object mass center (POMC), it means that the predicted location and the final result are consistent. At this point, the determination process is stable ad the time t tracking process can be terminated. If the two results are different, object location $OMC_t$ may be used as the new predicted object location $POMC_t$, and return to step 602.

Figure 7:
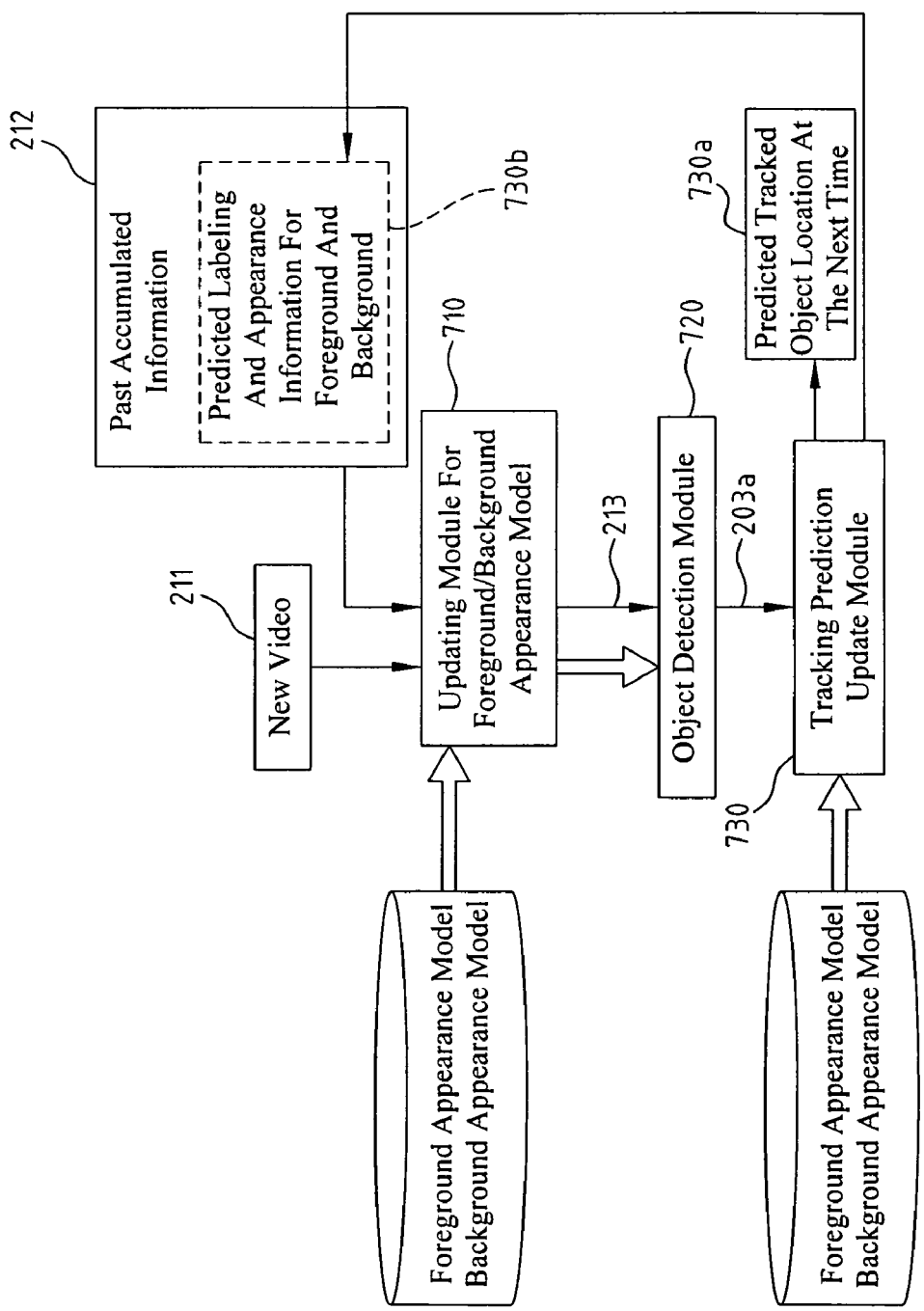
FIG. 7 shows a schematic view of an exemplary system for object detection and tracking, consistent with certain disclosed embodiments.

FIG. 7 shows a schematic view of an exemplary system for object detection and tracking, consistent with certain disclosed embodiments. As shown in FIG. 7, an object detection and tracking system 700 may include an updating module for foreground/background appearance model 710, an object detection module 720, and a tracking prediction update module 730.

Foreground and background appearance model update module 710 uses new input video 211 and accumulated information 212 of the past time to update the foreground and background appearance models. Object detection module 720 uses input new video 211, updated foreground and background models, and time axis information 213 propagated from the past to perform object detection and determine the optimal labeling at current time. Tracking prediction update module 730 uses object detection result 202a to update the information of the foreground and background appearance models until a convergent condition is met, and takes detection result 202a as a new tracking measurement. Tracking prediction module 730 predicts tracked object location 730a at the next time, and returns predicted foreground and background object labeling and appearance information 730b to updating module for foreground/background appearance model 710.

As aforementioned, the object detection and tracking system disclosed in the exemplary embodiments may simulate the object foreground appearance model and the background appearance model as a probability model. For each new observation, the probability model may provide the probability that the new observation belongs to the foreground or the background. Object detection module 720 may use the aforementioned 3-layer mechanism to determine the optimal classification labeling at the current time, or use an optimization operation module with the aforementioned equation to perform the determination of the optimal classification labeling.

Figure 8:
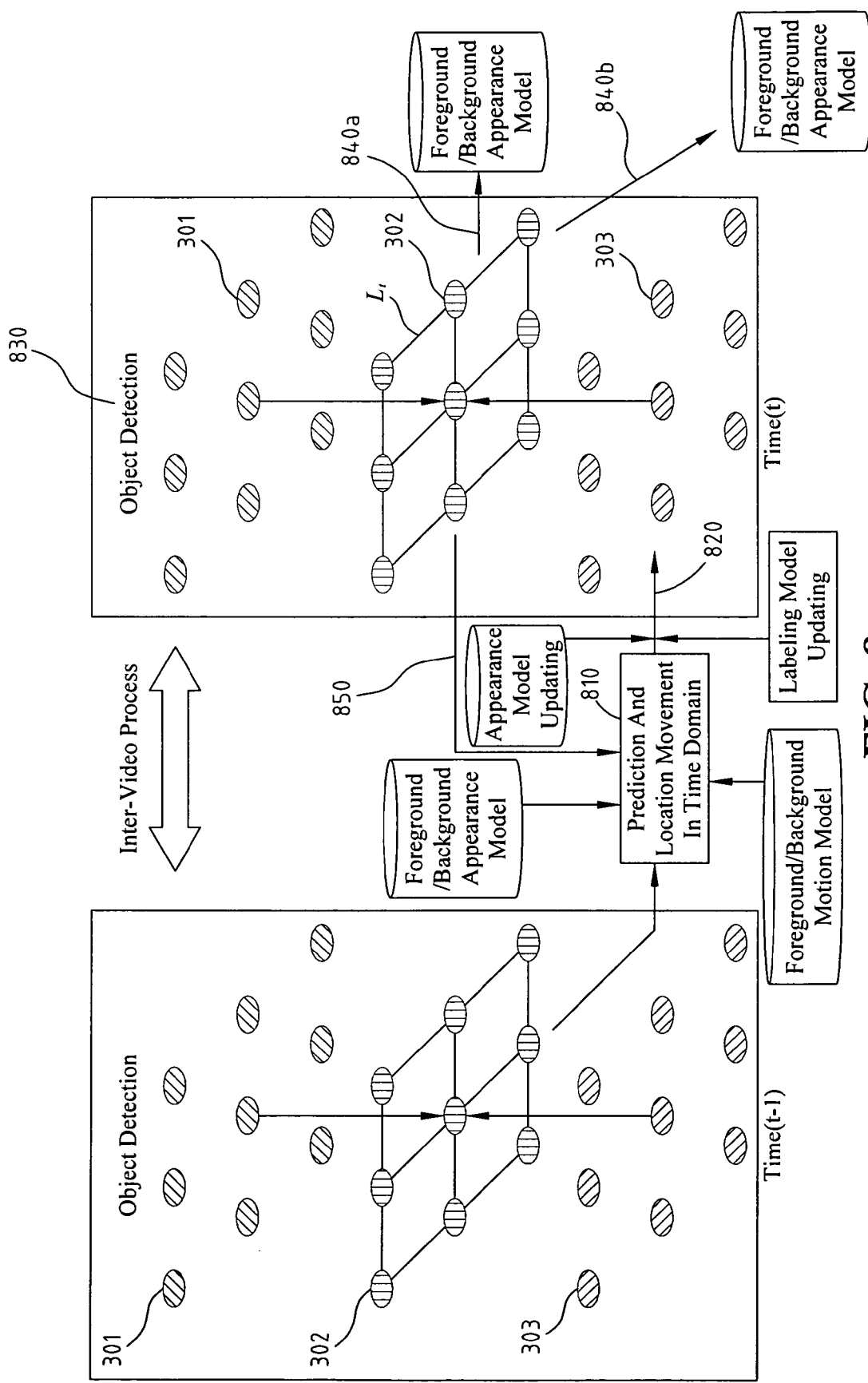
FIG. 8 shows a schematic view of the interaction between the object detection module and the tracking prediction update module in a scene, wherein the object detection module uses the 3-layer mechanism to determine the optimal classification labeling at current time, consistent with certain disclosed embodiments.

FIG. 8 shows a schematic view of the interaction between the object detection module and the tracking prediction update module in a scene, consistent with certain disclosed embodiments. Wherein, the object detection module uses the 3-layer mechanism of FIG. 3 to determine the optimal classification labeling at current time. Assume at previous time t−1, a plurality of independent objects exist in the scene composed of appearance model $A_{t-1}$, motion model $M_{t-1}$, and labeling model $L_{t-1}$.

As shown in FIG. 8, the prediction and location movement on time domain 810 may include predicting the locations of background object (b) and a foreground object ($f_i$) at time t, as follows:

$$M_{t-1}^b \xrightarrow{predict} M_t^{b\_p}; \quad M_{t-1}^{fi} \xrightarrow{predict} M_t^{fi\_p}$$

In 810, object location $M_{t-1}$ at time t−1 is used to update the motion model, and the possible location $M_t^p$ at time t is predicted based on the updated motion model. $M_t^p$ is also used as the initial value of the predicted location at time t.

Mark 820 shows the use of predicted location $M_t^p$ to update the foreground and background appearance model and labeling model, expressed as:

$$A_{t-1}^b(x) \xrightarrow{Warp\,(M_t^{b\_p})} A_t^{b\_p}(x);$$
$$L_{t-1}^b(x) \xrightarrow{Warp\,(M_t^{b\_p})} L_t^{b\_p}(x)$$
$$A_{t-1}^b(x) \xrightarrow{Warp\,(M_t^{b\_p})} A_t^{b\_p}(x);$$
$$L_{t-1}^b(x) \xrightarrow{Warp\,(M_t^{b\_p})} L_t^{b\_p}(x)$$

In 820, the location information of the initial value is used to transform the labeling at the previous time t−1 to the predicted location at time t and generate the memory prediction layer at time t.

Mark 830 shows that at time t, object detection module 720 obtains optimal hidden labeling $L_t$ at current time t after the optimization process based on the aforementioned object detection process.

Marks 840a and 840b show that tracking prediction update module 730, based on the object detection result of optimal hidden labeling $L_t$ at current time t and the appearance models and motion model at previous time t−1, updates the appearance models and the motion models at time t, expressed as:

$$L_t, A_{t-1} \xrightarrow{update} A_t; \quad L_t, M_{t-1}, M_t^p \xrightarrow{update} M_t$$

Mark 850 shows that tracking prediction update module 730 uses obtained hidden labeling $L_t$ to re-estimate the location of each foreground object to determine whether the tracking process at time t can be terminated, and uses the detection result as a new tracking measurement to update an initial value for predicting the tracked object location at the next time.

Therefore, according to the disclosed embodiments, the foreground and background appearance models may be continuously updated and adapt to the external changing environment. In addition, the disclosed embodiments also predict and update the foreground and background appearance models $P(x|\Omega_F)$ and $P(x|\Omega_B)$ before entering the object detection process. For example, using a foreground object as an example, assume that the object is currently at OMC and is predicted to move to POMC, the appearance models are updated based on the predicted location. After updating, foreground appearance model $P(x|\Omega_F)$ will reflect the high likelihood that the foreground object will appear near the OMC and POMC locations. If this object happens to move to a background area with appearance feature similar to this object, both foreground model $P(x|\Omega_F)$ and background model $p(x|\Omega_B)$ will reflect the high probability. This implies that the ambiguous area may be either foreground or background. Therefore, with the previously updated foreground model, the ambiguous area will be identified and possibility of erroneous labeling may be reduced. Further more, the memory prediction layer propagated from the previous time includes the prior labeling information, and the information may be effectively used to determine whether the ambiguous area should belong to the foreground or the background.

In addition, the disclosed embodiments use the result from the foreground and background optimized labeling to update the background model. The information on the labeled background may be used to update the background model. In actual applications, the foreground object may stay in the scene to become a part of the background, for example, a car parked for a period of time in a parking lot. For this situation, the disclosed embodiments will determine whether the foreground object has not moved for a long period of time. If so, the foreground object information will be updated to the background model, and the foreground object will become a part of the background.

In the aforementioned architecture with foreground and background models, the object detection process and the object tracking process may exchange information, such as, the result of the object detection may be used as the tracking measurement to dynamically maintain the object motion model. The prediction capability of the motion model provides a mechanism for propagating the past foreground and background labeling information to generate the prior information in time domain. In addition, the prediction capability of the motion model also provides a pre-update function for the appearance model. Thereby, it may be directly feedback to and help the object detection process. Therefore, according to the disclosed embodiments of the present invention, the information may be exchanged and shared between the object detection process and the object tracking process to improve the video analysis reliability as well as the stability of maintaining the foreground model and the background model.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for object detection and tracking, for detecting and tracking a plurality of continuous videos generated by the object motion in a scene, said method comprising:
   based on an input new video and the past accumulated information, updating information of a foreground appearance model and a background appearance model;
   based on information of said updated background appearance model and foreground appearance model, past propagated time axis information and current observed video, performing an object detection process;
   using detection result from said object detection process to update said information of said foreground appearance model and background appearance model until a convergent condition being met;
   using said convergent detection result as a new tracking measurement to update a tracking prediction model;
   using said updated tracking prediction model to obtain a final tracking result, said final tracking result being determined according to current tracking measurement and past observed tracking result; and
   predicting location of tracked object at the next time, and returning predicted labeling and appearance information of foreground and background objects as information required in the step of updating said foreground appearance model and background appearance model.

2. The method as claimed in claim 1, wherein said object detection process is an optimization problem defined as to determine the optimal classification labeling at current time according to current observed video information, updated foreground and background appearance models information and predicted labeling propagated from the previous time.

3. The method as claimed in claim 2, wherein said object detection process employs a 3-layer mechanism to process said optimized labeling of object detection.

4. The method as claimed in claim 3, wherein said 3-layer mechanism further includes:
   an observation information layer, providing current observed video color information;
   a hidden labeling layer, providing classification labeling of each pixel; and
   a memory prediction layer, providing predicted classification labeling propagated from the past.

5. The method as claimed in claim 2, wherein said optimization problem is described as a maximization problem of the combination of a likelihood function and a prior probability information.

6. The method as claimed in claim 2, wherein said object tracking module and said object detection process interact with each other, and share and feedback information generated by both.

7. The method as claimed in claim 6, wherein said interaction at least includes the steps of updating motion model, propagating predicted foreground and background labeling in time domain, foreground and background labeling classification, and repeating updating foreground and background labeling and foreground and background appearance model information.

8. The method as claimed in claim 7, wherein said updating motion model step at least includes:
   for each object, using location of said object at previous time to update motion model;
   based on updated motion model, predicting possible location for said object at current time and appearance information of appearing said location; and
   predicting object location at current time by taking said predicted location as an initial value.

9. The method as claimed in claim 8, wherein said step of propagating predicted foreground and background labeling in time domain at least includes:
   based on said initial predicted location information, transforming object labeling at previous time to predicted location at current time, and generating a memory prediction layer at current time for providing said object detection with the prior location information in time domain;
   at current time, obtaining a hidden labeling layer for providing classification labeling of each pixel through an optimization process; and
   after said optimization process, obtaining an optimal hidden labeling at current time.

10. The method as claimed in claim 9, wherein said step of repeating updating said foreground and background labeling at least includes:
    re-estimating location of each object through said optimal hidden labeling; and
    if each location of said object falling at a location near an area predefined and centered at predicted location of said object, then terminating tracking process at current time; otherwise, using said location of said object as a new predicted location and returning to said step of propagating predicted labeling information in time domain.

11. The method as claimed in claim 1, wherein said tracking prediction model uses a Bayesian filter to describe a dynamic system of a motion model.

12. The method as claimed in claim 1, wherein said object detection process integrates prior accumulated information on time domain and space domain and current observed probability information for consideration and making decision through constructing a Bayesian network model.

13. A method for object detection and tracking, for detecting and tracking a plurality of continuous videos generated by the object motion in a scene, said method comprising:
    simulate the foreground and background appearance models in said scene through a foreground probability model and a background probability model;
    based on current foreground and background appearance models, predicted information on time domain, and current observed video information, performing object detection and optimizing labeling of the foreground and background of the objects in said scene;
    based on new measured foreground and background labeling information of said objects in said scene and past object movement information learned and remembered, determining object movement location of objects in said scene at current time, and updating motion model and estimating object movement location at the next time; and based on object detection result at previous time and object movement information, updating said foreground and background appearance models;
    wherein said optimal labeling of said foreground and background is the optimal classification labeling, which is determined based on current observed video information, predicted labeling propagated from the previous time, and the foreground and background appearance models.

14. The method as claimed in claim 13, wherein the feature of said method is the simultaneous maintenance of said foreground appearance model and said background appearance model, and information sharing and feedback between object detection and object tracking.

15. A system for object detection and tracking, for detecting and tracking a plurality of continuous videos generated by the object motion in a scene, said system comprising:
   an updating module for foreground/background appearance model, based on an input new video and the past accumulated information, for updating a foreground appearance model and a background appearance model of object;
   an object detection module, based on said new input video, said updating module for foreground/background appearance model, and past propagated time axis information, performing object detection and determining optimal classification labeling at current time; and
   a tracking prediction update module, updating said information of said foreground appearance model and background appearance model until a convergent condition being met through detection result from said object detection process, updating a tracking prediction model, predicting location of tracked object at the next time by taking said convergent detection result as a new tracking measurement, and returning predicted labeling and appearance information of foreground and background objects as information required in updating said foreground appearance model and background appearance model.

16. The system as claimed in claim 15, wherein said object detection module determines said optimal classification labeling at current time through a 3-layer mechanism.

17. The system as claimed in claim 15, wherein said object detection module performs the determination of said optimal classification labeling through an optimizing labeling computation module.

18. The system as claimed in claim 15, wherein said system simulates said foreground and background appearance models through a probability model, and for each new observation, said probability model provides the probability that said new observation belongs to foreground or background.

* * * * *